Patented May 9, 1950

2,507,233

UNITED STATES PATENT OFFICE 2,507,233

ELECTRIC RESISTANCE AND METHOD OF MAKING

Evert Johannes Willem Verwey, Eindhoven, Netherlands, assignor, by mesne assignments, to Hartford National Bank and Trust Company, Hartford, Conn., as trustee No Drawing. Application May 9, 1946, Serial No. 668,471. In the Netherlands June 6, 1941

Section 1, Public Law 690, August 8, 1946
Patent expires June 6, 1961

3 Claims. (Cl. 201—76)

This invention has for its purpose to obtain electric resistances which have a high resistance value at room temperature, exhibit a low temperature coefficient of the resistance, have a high load capacity, can endure high ambient temperatures and are highly resistant to chemical attack.

Though resistances containing carbon as conductive material exhibit a low temperature coefficient, such resistances have not a high load capacity, cannot endure high ambient temperatures and are not resistant to chemical attack. On the other hand, resistances are known which consist to an important part of semi-conductive oxides which, though not exhibiting the said drawbacks of carbon resistances, have a high negative temperature coefficient of resistance.

The invention permits of obviating the last-mentioned difficulty so far that in the resistance temperature equation $$W_T = Ac\frac{b}{T}$$

the value $b$ is comprised between $+700$ and $-700$, so that the variation of the resistance with temperature becomes sufficiently small for technical applications. According to the invention, this is achieved by heating in a sintering manner a mixture of magnesium oxide and at most 3% by weight of titanium oxide at a temperature higher than 1700° C., preferably 1800° to 2000° C., in a reducing gaseous current having a percentage of oxygen of at least 0.003% by volume in relation to the hydrogen contained in it.

In the manufacture of resistances according to the invention it is necessary to use temperatures higher than 1700° C. In this case unexpected difficulty is encountered, so far as the obtainment of the desired resistance value is concerned, if at this temperature use is made of purified hydrogen. This difficulty does not occur if the percentage of oxygen of the hydrogen is chosen above a definite minimum.

According to the invention, it is possible to obtain a desired resistance value not only by variation of the mixing ratio of the magnesium oxide and the titanium oxide but also by exactly adjusting the percentage of oxygen of the reducing gas above the said minimum. In this case the percentage of oxygen remains in most cases below 0.1% by volume.

The percentage of oxygen of the gaseous current may be adjusted by utilizing different methods of purification. Thus, by copper chips heated at 600° C., by finely distributed copper on infusorial earth heated at 200° C., by an alkaline pyrogallol solution and by a tungsten filament glowing at about 1500° C., in the said sequence, increasing amounts of oxygen are taken up from the gas. Other concentrations may be obtained, if desired, by conjunction with more or less intensely drying with the aid of the various siccatives known per se.

All the resistances according to the invention exhibit an X-ray photograph which, in addition to showing the lines of magnesium oxide, shows weak lines of highly reduced titanium oxide, the latter lines fully corresponding to those of titanium oxide of the composition $TiO_x$ ($x$ between 1.65 and 1.7). It thus appears that the resistances according to the invention consist of an insulating mass of magnesium oxide in which conductive particles of reduced titanium oxide are dispersed.

Due to this two-phase structure, it is possible to regulate the resistance value not only by the steps above referred to, but also by the size of grain of the primary material and the sintering temperature, which are of influence on the nature of the dispersion. The size of grain of the primary materials may be controlled by preheating and by grinding. The dispersion of the titanium oxide in the magnesium oxide may be controlled by the state in which the titanium oxide is added. Use may be made of titanium dioxide, either in the rutile or in the anatase modification, or of conductive titanium oxide already partly reduced, or again of corresponding mixtures of titanium dioxide and titanium. It is in addition possible to use the said materials in the mixed state.

The resistances according to the invention may be used, for example, as series resistances in ignition circuits of gaseous discharge tubes. In view of their high resistance against chemical attack they may even be mounted, for example, in mercury discharge tubes or be used as igniting electrodes of high resistance which are partly immersed in mercury, as in current converter tubes, etc. In view of their high load capacity the resistances according to the invention are also advantageous for receiving and transmitting installations, while they may also be incorporated in radio tubes.

The invention will be explained more fully by reference to a few practical examples.

Example I

Technically pure magnesium oxide (percentage of alkali less than 0.1%) is preheated at 950° C.

and then mixed with 2% by weight of pure titanium dioxide in the rutile state and ground with alcohol during about 5 hours in a ball-mill. Of this mass, rods are formed with the addition of a binder, for example methyl cellulose, which rods are dried, whereafter the binder is removed by heating at 1300° to 1400° C. and rods of sufficient coherence are obtained. Subsequently, they are sintered by heating with alternating current at a temperature of 1900° C. during 5 minutes in a gaseous current, which is constituted by about 80% by volume of nitrogen, about 20% by volume of hydrogen and 0.003% by volume of oxygen, after the conduction had been initiated by a heat treatment at about 1200° C. which, if desired, may also be effected in the reducing gaseous current. A resistance rod thus obtained having a length of about 10 mm. and a diameter of about 2.5 mm. had a resistance value of $3.10^6$ ohms at room temperature.

When the magnesium oxide was mixed with 2% by weight of anatase instead of rutile, then a resistance of $5.10^5$ ohms was obtained.

When only 1% by weight instead of 2% by weight of rutile was used, then the resistance value was $10^9$ ohms.

*Example II*

Magnesium oxide preheated at 1100° C is worked with 2% by weight of anatase to form rods in the manner described in Example I. These are subsequently heated by alternating current during 5 minutes at about 1900° C. in a current of nitrogen. Then, the current of nitrogen is replaced by a gaseous current consisting of about 80% by volume of $N_2$, 20% by volume of $H_2$ and 0.003% by volume of $O_2$, after which the heating is continued during another 5 minutes. The resistances obtained had a value of $3.10^4$ ohms.

*Example III*

Magnesium oxide preheated at 1100° C is worked with 2% by weight of anatase to form rods in the manner as in Example I. These rods are subsequently sintered in an oven having a tube of beryllium oxide at 1800° C. in a current of hydrogen containing 0.003% by volume of oxygen. The resistances obtained had a value of $2.10^4$ ohms. When the hydrogen contained 0.013% by volume of oxygen, then the resistance value became $3.10^5$ ohms, whereas with an oxygen content of 0.065% by volume it amounted to about $10^6$ ohms.

What I claim is:

1. A low temperature coefficient electrical resistance element consisting essentially of a two-phase crystalline structure constituted by magnesium oxide, and conductive particles of a titanium oxide corresponding to the formula $TiO_x$ in which $x$ has a value between 1.65 and 1.7 in an amount up to approximately 3% by weight of said magnesium oxide dispersed in the latter.

2. A method of manufacturing low temperature coefficient electrical resistance elements, comprising the steps of mixing magnesium oxide and up to approximately 3% by weight of titanium dioxide, and sintering said mixture at a temperature of about 1700° to 2000° C. in an atmosphere containing hydrogen at least approximately 0.003% of oxygen by the volume of hydrogen.

3. A method of manufacturing a low temperature coefficient electrical resistance element, comprising the steps of mixing technically pure magnesium oxide and approximately 2% by weight of pure titanium dioxide, and sintering said mixture at a temperature of approximately 1900° C. for five minutes in an atmosphere consisting of approximately 80% by volume of nitrogen and approximately 20% by volume of hydrogen, said atmosphere containing a small quantity of oxygen equivalent to approximately 0.003% by volume of the hydrogen in the atmosphere.

EVERT JOHANNES WILLEM VERWEY.

REFERENCES CITED

The following references are of record in the file of this patent:

UNITED STATES PATENTS

| Number | Name | Date |
|---|---|---|
| 2,175,916 | Pulfrich | Oct. 10, 1939 |
| 2,272,480 | Riddle | Feb. 10, 1942 |
| 2,289,211 | Ridgway | July 7, 1942 |

FOREIGN PATENTS

| Number | Country | Date |
|---|---|---|
| 16,140 | Great Britain | 1899 |
| 204,143 | Germany | 1908 |
| 486,856 | Germany | 1929 |
| 438,706 | Great Britain | Nov. 21, 1935 |
| 467,113 | Great Britain | 1937 |
| 498,904 | Great Britain | 1937 |